United States Patent
Gafni et al.

(10) Patent No.: US 9,525,623 B2
(45) Date of Patent: Dec. 20, 2016

(54) IMPLEMENTING MPLS PIPE MODELS IN A LOSSLESS NETWORK

(71) Applicant: MELLANOX TECHNOLOGIES TLV LTD., Ra'anana (IL)

(72) Inventors: Barak Gafni, Kfar Malal (IL); Ilya Vershkov, Rishon Lezion (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 54 days.

(21) Appl. No.: 14/705,003

(22) Filed: May 6, 2015

(65) Prior Publication Data

US 2016/0330114 A1    Nov. 10, 2016

(51) Int. Cl.
    H04L 12/28     (2006.01)
    H04L 12/723    (2013.01)
    H04L 12/721    (2013.01)

(52) U.S. Cl.
    CPC .............. H04L 45/50 (2013.01); H04L 45/66 (2013.01)

(58) Field of Classification Search
    None
    See application file for complete search history.

(56) References Cited

U.S. PATENT DOCUMENTS

| | | | |
|---|---|---|---|
| 7,061,911 B2 * | 6/2006 | Furuno | H04L 12/4633 370/392 |
| 7,088,718 B1 * | 8/2006 | Srivastava | H04L 45/00 370/392 |
| 7,260,079 B1 * | 8/2007 | Chapman | H04W 28/20 370/252 |

OTHER PUBLICATIONS

Rosen et al., "Multiprotocol Label Switching Architecture", Network Working Group, Request for Comments 3031, 61 pages, Jan. 2001.
Rosen et al., "MPLS Label Stack Encoding", Network Working Group, Request for Comments 3032, 23 pages, Jan. 2001.
Fang et al., "MPLS-Based Hierarchical SDN for Hyper-Scale DC/Cloud draft-fang-mpls-hsdn-for-hsdc-00", IETF Internet-Draft, 24 pages, Oct. 27, 2014.
Fang et al., "SDN and MPLS for DC", Microsoft, 16 pages, Nov. 3, 2014.
Afanasiev et al., "MPLS in DC and inter-DC networks: the unified forwarding mechanism for network programmability at scale", 40 pages, SDN/MPLS 2014 International Conference, Nov. 2-5, 2014.
Gafni et al., U.S. Appl. No. 14/634,842 dated Mar. 1, 2015.
Kompella et al., "The Use of Entropy Labels in MPLS Forwarding", Internet Engineering Task Force (IETF), RFC 6790, 25 pages, Nov. 2012.
Gafni et al., U.S. Appl. No. 14/665,005 dated Mar. 23, 2015.

(Continued)

Primary Examiner — Duc C Ho
(74) Attorney, Agent, or Firm — D. Kligler IP Services Ltd.

(57) ABSTRACT

A method for communication includes defining a pipe traversing a sequence of routers through an MPLS network, and specifying for the pipe an outer label that indicates a first quality of service (QoS) for the packets in the pipe. Upon receiving a packet at the ingress to the pipe, the outer label is appended to the packet, and the packet with the outer label is forwarded through the pipe. At each of the routers in the sequence, the packet is forwarded through the pipe in accordance with the outer label at the first quality of service. At a transitional router, in proximity to the egress from the pipe, the outer label is popped from the packet, and a second QoS is identified based on a field remaining in the packet after popping the outer label. The packet is then forwarded at the second QoS.

16 Claims, 3 Drawing Sheets

(56) References Cited

OTHER PUBLICATIONS

Le Faucheur et al., "Multi-Protocol Label Switching (MPLS) Support of Differentiated Services", Network Working Group, RFC 3270, 56 pages, May 2002.
Blake et al., "An Architecture for Differentiated Services", Network Working Group, RFC 2475, 36 pages, Dec. 1998.
IEEE 802.1Q, "IEEE Standard for Local and metropolitan area networks Virtual Bridged Local Area Networks", IEEE Computer Society, 303 pages, May 19, 2006.
IEEE 802.1Qbb, "IEEE Standard for Local and metropolitan area networks—Media Access Control (MAC) Bridges and Virtual Bridged Local Area Networks—Amendment 17: Priority-based Flow Control", IEEE Computer Society, 40 pages, Sep. 30, 2011.

\* cited by examiner

IMPLEMENTING MPLS PIPE MODELS IN A LOSSLESS NETWORK

FIELD OF THE INVENTION

The present invention relates generally to computer networks, and specifically to routing and forwarding of data packets in such networks.

BACKGROUND

Multiprotocol Label Switching (MPLS) is a mechanism for packet routing that is widely used in high-performance computer networks. In an MPLS network, data packets are assigned labels, and packet-forwarding decisions are made solely on the contents of the labels, without the need to examine the network address of the packet itself. The MPLS architecture and label structure were originally defined by Rosen et al. in Requests for Comments (RFCs) 3031 and 3032 of the Internet Engineering Task Force (IETF) Network Working Group (2001), which are incorporated herein by reference.

MPLS is a network-layer protocol (Layer 3 in the Open Systems Interconnection [OSI] model), which is implemented by routers in place of or in addition to address-based routing. At the ingress to an MPLS network, a prefix is appended to the packet header, containing one or more MPLS labels. This prefix is called a label stack. According to RFC 3032, each label in the label stack contains four fields:

- A 20-bit label value (commonly referred to as the label identifier or "label ID").
- A 3-bit traffic class field for QoS (quality of service) priority and ECN (explicit congestion notification) signaling (also referred to as the "EXP" or traffic class—"TC"—field).
- A 1-bit bottom-of-stack flag, which is set to indicate that the current label is the last in the stack.
- An 8-bit TTL (time to live) field.

A router that routes packets based on these labels is called a label-switched router (LSR). According to RFC 3031, when an LSR receives a packet, it uses the label at the top of the stack in the packet header as an index to an Incoming Label Map (ILM). The ILM maps each incoming label to a set of one or more entries in a Next Hop Label Forwarding Entry (NHLFE) table. Alternatively, when packets arrive at the LSR unlabeled, a "FEC-to-NHLFE" function (FTN) maps each "Forwarding Equivalence Class" (FEC) to a set of one or more NHLFE table entries. In either case, each NHLFE indicates the next hop for the packet and an operation to be performed on the label stack. These operations may include replacing the label at the top of the stack with a new label, popping the label stack, and/or pushing one or more new labels onto the stack. After performing the required label stack operations, the LSR forwards the packet through the egress interface indicated by the NHLFE.

In Internet Protocol (IP) networks that support Differentiated Service ("Diff-Serv"), packet IP headers may contain a "Diff-Serv Code Point" (DSCP) value, which classifies packets according to different quality of service (QoS) levels. As a packet passes through the network, each transit node selects the scheduling treatment, and possibly the drop probability, for the packet depending on its DSCP value. This Diff-Serv architecture was defined initially by Blake et al., in IETF RFC 2475 (1998), which is incorporated herein by reference.

Le Faucheur et al. defined a framework for MPLS support of Diff-Serv functionality in IETF RFC 3270 (2002), which is also incorporated herein by reference. In this context, the EXP field in the MPLS label is generally used to indicate the scheduling class. In particular, in MPLS tunnels (as described in section 2.6 of RFC 3270), the EXP field of the outer packet label indicates the scheduling class along the entire length of the tunnel, and LSRs along the tunnel consider only this external label. In the "Pipe Model," described in subsection 2.6.2, intermediate nodes along the tunnel consider only "LSP Diff-Serv Information," which is carried in the outer MPLS label and is meaningful only within the tunnel. Diff-Serv information that is meaningful beyond the tunnel egress, such as an EXP value in an inner MPLS label or the DSCP value in the IP header that is encapsulated behind the outer MPLS label, is referred to as "Tunneled Diff-Serv Information" and is ignored by the LSPs along the tunnel.

Subsection 2.6.2.1 of RFC 3270 describes a variant on the MPLS Pipe Model, referred to as the "Short Pipe Model." In this case, the Diff-Serv forwarding treatment at the egress LSR from the tunnel is applied based on the Tunneled Diff-Serv Information. Because the egress LSR does not use the LSP Diff-Serv Information in forwarding the packet onward, the Short Pipe Model can operate with Penultimate Hop Popping (PHP), in which the next-to-last (penultimate) LSR in the tunnel pops and discards the outer MPLS label containing the LSP Diff-Serv Information. PHP is thus useful in reducing the label-processing burden on the egress LSR.

A label-switched path (LSP) is also referred to as an MPLS tunnel. Formally, an LSP defined as a sequence of LSRs, beginning with an ingress LSR and ending with an egress LSR, which forward packets along the LSP based on the outer packet labels, which are at a certain level of the label hierarchy within the network (i.e., the outer label is at the top of a label stack that maintains the same depth throughout the tunnel). The term "pipe" is used specifically, in the present description and in the claims, to refer to an MPLS LSP that applies LSP Diff-Serv Information in forwarding packets through the LSP, as defined above.

Protocols for differentiated service levels also exist in Layer 2 networks. For example, in Ethernet networks, the IEEE 802.1Q standard defines a 3-bit field known as the Priority Code Point (PCP) in the frame header, which can be used to differentiate traffic into eight levels of priority for purposes of quality of service (QoS). The IEEE 802.1Qbb project authorization request (PAR) provides priority-based flow control (PFC) as an enhancement to the traditional Ethernet pause mechanism for flow control on a physical link. PFC creates eight separate virtual links on a given physical link and allows the receiver to pause and restart the virtual links independently. PFC thus enables the operator to implement differentiated quality of service (QoS) policies for the eight virtual links.

The references cited above use various different terms and parameters in defining QoS levels, such as "Diff-Serv information" and DSCP, EXP, TC, and PCP values, for example. The term "quality of service" (abbreviated as "QoS") is used in the present description and in the claims to refer to and include all of these various terms and parameters, unless stated otherwise or required by the context of usage.

SUMMARY

Embodiments of the present invention that are described hereinbelow provide enhanced methods and apparatus for label-based routing and forwarding.

There is therefore provided, in accordance with an embodiment of the invention, a method for communication, which includes configuring routers in a packet data network to forward packets over the network in accordance with Multiprotocol Label Switching (MPLS) labels appended to the packets. A pipe through the network is defined, having an ingress router and an egress router and traversing a sequence of the routers between the ingress and the egress. An outer label is specified for the pipe, indicating a first quality of service for the packets in the pipe.

Upon receiving at the ingress a packet for transmission through the pipe, the outer label is appended to the packet, and the packet with the outer label is forwarded through the pipe. At each of the routers in the sequence, up to a transitional router in proximity to the egress, the packet is forwarded through the pipe in accordance with the outer label at the first quality of service. At the transitional router, the outer label is popped from the packet, and a second quality of service, different from the first quality of service is identified based on a field remaining in the packet after popping the outer label. The packet is forwarded through the egress from the pipe toward a destination of the packet at the second quality of service.

Typically, forwarding the packet includes signaling the second quality of service from the transitional router to a recipient router that is to receive the forwarded packet from the transitional router.

In a disclosed embodiment, the transitional router is a penultimate router, and forwarding the packet through the egress includes forwarding the packet from the penultimate router to an egress router of the pipe, wherein the egress router continues to forward the packet toward the destination at the second quality of service.

In one embodiment, the field remaining in the packet includes a traffic class field of an inner MPLS label, which was encapsulated by the outer label. Alternatively, the field remaining in the packet includes a Diff-Serv field of an Internet Protocol (IP) header, which was encapsulated by the outer label or a Priority Code Point (PCP) field of a Layer-2 header of the packet.

There is also provided, in accordance with an embodiment of the invention, a method for communication, which includes configuring routers in a packet data network to forward packets over the network in accordance with Multiprotocol Label Switching (MPLS) labels, which are appended to the packets and indicate qualities of service for the packets in the network. A given router in the network receives a packet forwarded to the given router in accordance with an outer label appended to the packet, with a first quality of service indicated by the outer label. The given router pops the outer label from the packet and forwards the packet over a Layer-2 link toward a destination of the packet with a second quality of service, different from the first quality of service, that is indicated by a Priority Code Point (PCP) field of a Layer-2 header of the packet.

In a disclosed embodiment, the Layer-2 link includes an Ethernet link.

There is additionally provided, in accordance with an embodiment of the invention, a system for communication, including a plurality of routers in a packet data network, which are configured to forward packets over the network in accordance with Multiprotocol Label Switching (MPLS) labels appended to the packets, and to accept a definition of a pipe through the network having an ingress and an egress and traversing a sequence of the routers between the ingress and the egress, and a specification for the pipe of an outer label that indicates a first quality of service for the packets in the pipe. One of the routers, at the ingress of the pipe, is configured as an ingress router of the pipe, and another of the routers, in proximity to the egress from the pipe, is configured as a transitional router.

Upon receiving a packet for transmission through the pipe, the ingress router appends the outer label to the packet, and forwards the packet with the outer label through the pipe, so that each of the routers in the sequence, up to the transitional router, forwards the packet through the pipe in accordance with the outer label at the first quality of service. The transitional router pops the outer label from the packet, identifies, based on a field remaining in the packet after popping the outer label, a second quality of service, different from the first quality of service, and forwards the packet through the egress from the pipe toward a destination of the packet at the second quality of service.

There is further provided, in accordance with an embodiment of the invention, a system for communication, including a plurality of routers in a packet data network, which are configured to forward packets over the network in accordance with Multiprotocol Label Switching (MPLS) labels, which are appended to the packets and indicate qualities of service for the packets in the network. At least one of the routers in the network is configured, upon receiving a packet forwarded to the at least one of the routers in accordance with an outer label appended to the packet, with a first quality of service indicated by the outer label, to pop the outer label from the packet, and to forward the packet over a Layer-2 link toward a destination of the packet with a second quality of service, different from the first quality of service, that is indicated by a Priority Code Point (PCP) field of a Layer-2 header of the packet.

The present invention will be more fully understood from the following detailed description of the embodiments thereof, taken together with the drawings in which:

DETAILED DESCRIPTION OF EMBODIMENTS

Figure 1:
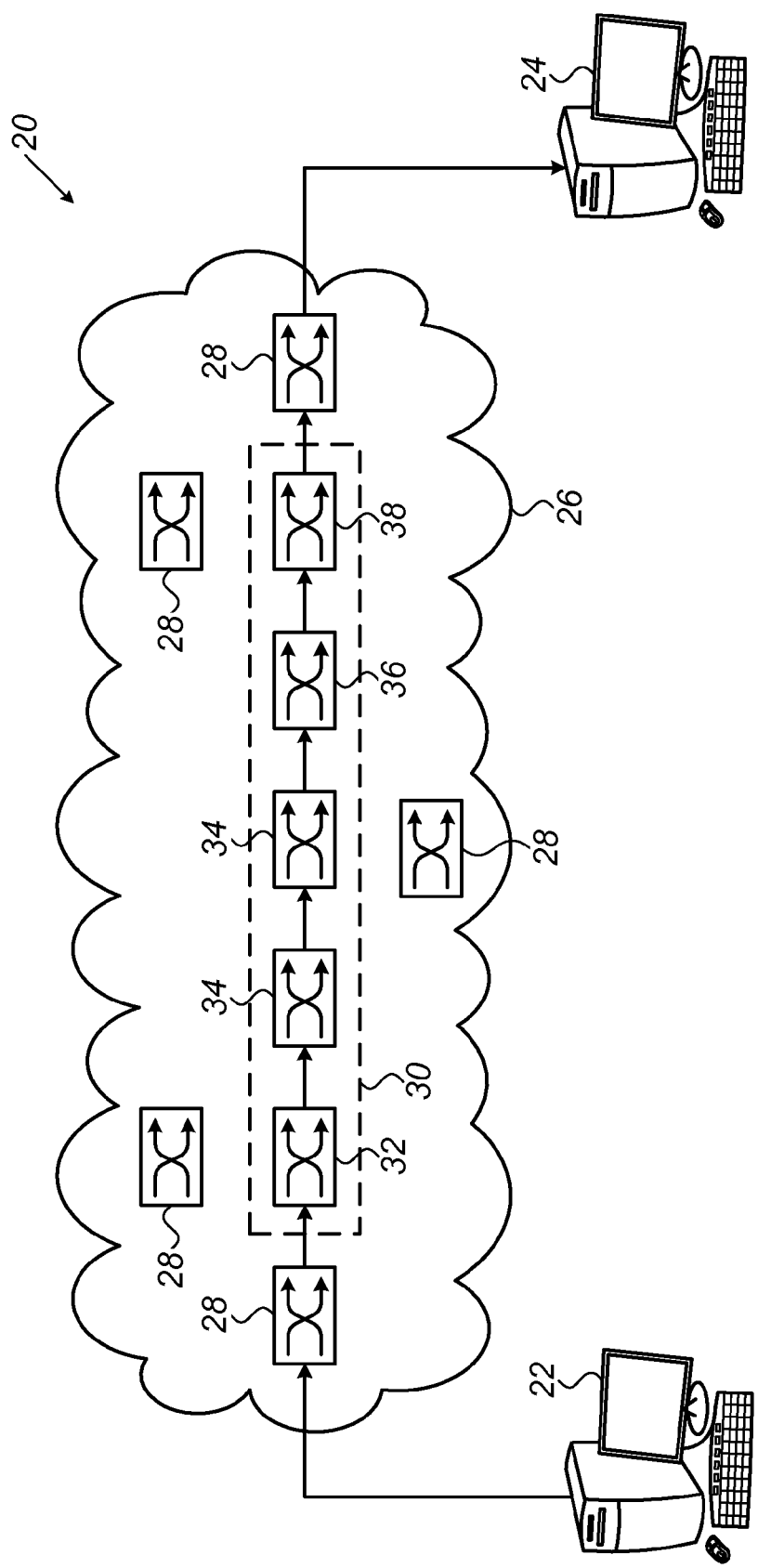
FIG. 1 is a block diagram that schematically illustrates a system for packet data communications, in accordance with an embodiment of the invention.

IP networks are usually lossy, meaning that even packets with Diff-Serv values corresponding to a high QoS may be dropped when congestion occurs. MPLS label-based routing was designed to operate similarly to IP networks and can likewise be lossy. In some applications, however, there is a demand that an IP or MPLS network support lossless traffic, meaning that packets should not be dropped even when congestion occurs. Meeting this demand in existing IP and MPLS networks can be difficult or impossible, since the original protocols were not designed with the possibility of lossless performance in mind.

For example, a mismatch between the QoS within an MPLS pipe, as indicated by the LSP Diff-Serv Information in the outer packet label, and the QoS following the egress from the pipe, as indicated by the Tunneled Diff-Serv Information, can cause packets to be discarded. This sort of situation can occur particularly when the QoS level indicated by the EXP field in the outer packet label that is used in the pipe is different from the QoS level indicated by the QoS field (which may be the EXP, DSCP, or PCP field, depending on local configuration) of the packets forwarded out of the pipe by a transitional router in proximity to the egress. The MPLS architecture, as presently defined, is incapable of enforcing end-to-end QoS and thus cannot guarantee packet delivery.

In order to alleviate this difficulty, some embodiments of the present invention, as described hereinbelow, break the existing label-based forwarding paradigm in order to maintain consistent QoS between successive nodes along label-based packet forwarding paths. The disclosed embodiments relate to a pipe defined in a packet data network, in which routers forward packets in accordance with MPLS labels appended to the packets. In the present embodiments, as in pipes that are known in the art, a certain outer label is appended to packets at the ingress to the pipe and indicates the QoS with which packets are to be forwarded by each of the sequence of routers making up the pipe. The outer label and the corresponding QoS are maintained up to a transitional router in proximity to the egress from the pipe. The transitional router may be either the actual egress router of the pipe or the penultimate router, just preceding the egress router, depending upon whether or not PHP is in use.

The transitional router pops the outer label from the packet and identifies, based on a field remaining in the packet after popping the outer label, the QoS at which the packet is to be forwarded onward toward its destination, following the egress from the pipe. This QoS field may comprise, for example, the traffic class (EXP) field of the inner MPLS label, which was encapsulated by the previous outer label, or the Diff-Serv field of the IP header, which was similarly encapsulated. Alternatively, the QoS field identified by the transitional router may be part of a Layer-2 header of the packet, such as the Ethernet PCP field. In any case, the transitional router forwards the packet onward at the new QoS indicated by the field that it has identified, even when this new QoS is different from the QoS indicated by the outer label used within the pipe. This novel approach prevents the sort of QoS mismatch that can occur at the pipe egress in MPLS networks that are known in the art, and thus supports lossless transmission through the network.

The principles of the present embodiments are particularly (though not exclusively) useful at the point of transition between an MPLS network and a Layer-2 network link, such as an Ethernet link. In this case, by forwarding packets at the QoS indicated by a PCP value applicable on the Layer-2 link, rather than by the MPLS labels, the transitional MPLS router ensures that lossless transmission can be maintained over the Layer-2 link. This approach is useful not only at the egress from MPLS pipes, but also in other label-switched network configurations and use cases.

FIG. 1 is a block diagram that schematically illustrates a system 20 for packet data communications, in accordance with an embodiment of the invention. In the pictured example, a source computer 22 transmits packets via a packet data network 26 to a destination computer 24. (Although only two such computers are shown here for the sake of simplicity, network 26 typically serves hundreds or thousands of such computers.) Network 26 is a Layer-3 network, such as an IP network, comprising multiple routers 28, 32, 34, 36, 38, which are configured to forward packets over the network in accordance with MPLS labels appended to the packets. In this sense, the routers in network 26 may also be referred to as LSRs, in accordance with accepted MPLS terminology.

Packets are transmitted from source computer 22 to destination computer 24 through a pipe 30 passing through network 26. Pipe 30 has an ingress, at an ingress router 32, and an egress, following an egress router 38. Pipe 30 traverses a sequence of intermediate routers 34 between the ingress and the egress, culminating in a penultimate router, which precedes egress router 38. Ingress router 32 appends an outer label to packets transmitted through pipe 30, which identifies the packets as belonging to the pipe and indicates, inter alia, the QoS with which routers 32, 34, 36 are to forward the packets through the pipe. Although only a single pipe is shown in FIG. 1 for the sake of simplicity, in practice network 26 typically supports many pipes of this sort, linking different sources and destinations, or groups of sources and destinations, each pipe having its own label and QoS.

Routers 28, 32, 34, 36, 38 typically comprise multiple interfaces connected to network 26 and switching logic configured to transfer data packets among the interfaces. Packet processing logic in the routers directs the switching logic to forward the data packets in accordance with the MPLS labels that are appended to the data packets, generally as defined in the above-mentioned RFCs 3031 and 3032. Among other functions, the packet processing logic selects for each packet, based on the outer label and the corresponding ILM and NHLFE table entries, the output interface through which the packet is to be forwarded and the queue or egress buffer in which the packet should be queued for transmission. Each queue or egress buffer has a certain priority, which corresponds to the QoS of the packets assigned to that queue or buffer and is generally determined by the EXP field in the outer label of the packet. Further aspects of the design and operation of the routers in network 26, as well as additional features that may be implemented in such routers, are described, for example, in U.S. patent application Ser. No. 14/634,842, filed Mar. 1, 2015, whose disclosure is incorporated herein by reference.

Figure 2:
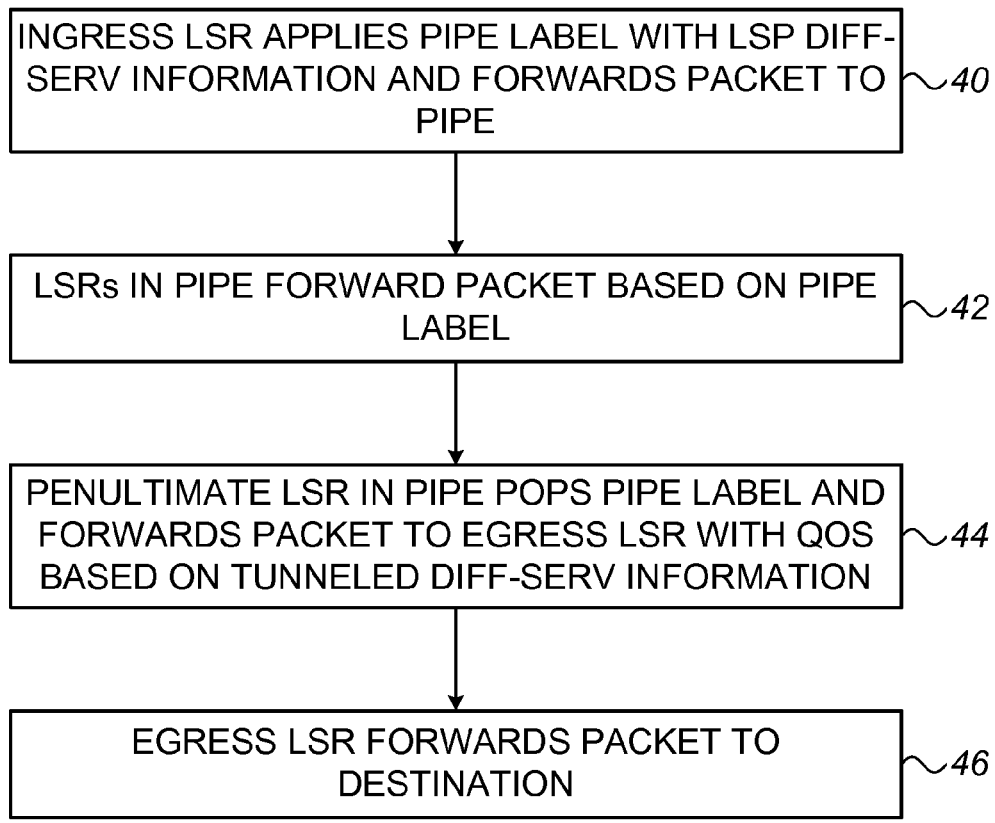
FIG. 2 is a flow chart that schematically illustrates a method for label-based packet forwarding, in accordance with an embodiment of the invention.

FIG. 2 is a flow chart that schematically illustrates a method for label-based packet forwarding, in accordance with an embodiment of the invention. The method is described, for the sake of clarity and concreteness, with reference to pipe 30 in network 26. The principles of this method, however, may alternatively be applied in other pipe configurations and, mutatis mutandis, at other points of transition between an MPLS forwarding domain, in which QoS is determined by a certain outer label, and another domain in which the packet has a different QoS basis, such as an inner (tunneled) label or an IP header or Ethernet MAC header. The router at which the QoS transition occurs, such as egress router 38 or penultimate router 36 in FIG. 1, is referred to herein as the "transitional router." In the example shown in FIG. 2, it is assumed that PHP is in force in pipe 30, so that penultimate router 36 serves as the transitional router.

The method of FIG. 2 is initiated when ingress router 32 receives a packet for transmission through pipe 30, at a packet ingress step 40. The ILM or FTN function in router identifies the packet, based on its label or header fields, as belonging to the pipe and points to the label, in the NHLFE table of the router, that is to be appended to the packet. This label contains a Diff-Serv value in the EXP field or otherwise indicates the QoS of pipe 30. Ingress router 32 appends this outer label to the packet, and forwards the packet in this form to the next router 34 in the pipe. Each of routers 34 in the sequence making up pipe 30 forwards the packet through the pipe in accordance with the outer label, and thus enforces the QoS level that is indicated by the LSP Diff-Serv Information in the outer label, at a pipe forwarding step 42.

This forwarding behavior continues through the sequence of routers 34 up to penultimate router 36, which pops the outer label from the packet, at a label popping step 44. (Alternatively, as noted above, pipe 30 may be configured so that this transitional behavior occurs at egress router 38.) Penultimate router 36 forwards the packet on to egress router 38 with a QoS that is not determined by the LSP Diff-Serv Information, but is rather dependent on Tunneled Diff-Serv Information. This Tunneled Diff-Serv Information is provided by a field remaining in the packet after popping the outer label, and may indicate a QoS that is different from the QoS in the tunnel. As noted earlier, this field may be, for example, the EXP field in an inner packet label, or the DSPC field in a tunneled IP header, or the PCP value for a Layer-2 link through which the packet is to be forwarded toward its destination.

Egress router 38 receives the packet from penultimate router 36 and forwards the packet on toward destination computer 24, at a packet forwarding step 46. Because of the QoS switch performed by the penultimate router, the QoS used to transmit the packet from the penultimate router to the egress router matches that applied by the egress router in transmission over the next hop through network 26. In some cases, as noted earlier, this next hop is a Layer-2 link to a Layer-2 switch, which may be located at the edge of network 26 or may even be a physical or virtual switching function in the network interface controller (NIC) of computer 24. Matching the QoS at the egress router to the QoS of the next hop in this manner is beneficial in avoiding packet loss and is thus particularly useful in supporting lossless transport through network 26.

Alternatively, when PHP is not used, the Outer Diff-Serv Information determines the QoS of transmission over all hops in pipe 30, and the QoS transition occurs only at egress router 38. In other respects, however, the method of FIG. 2 proceeds as described above.

Figure 3:
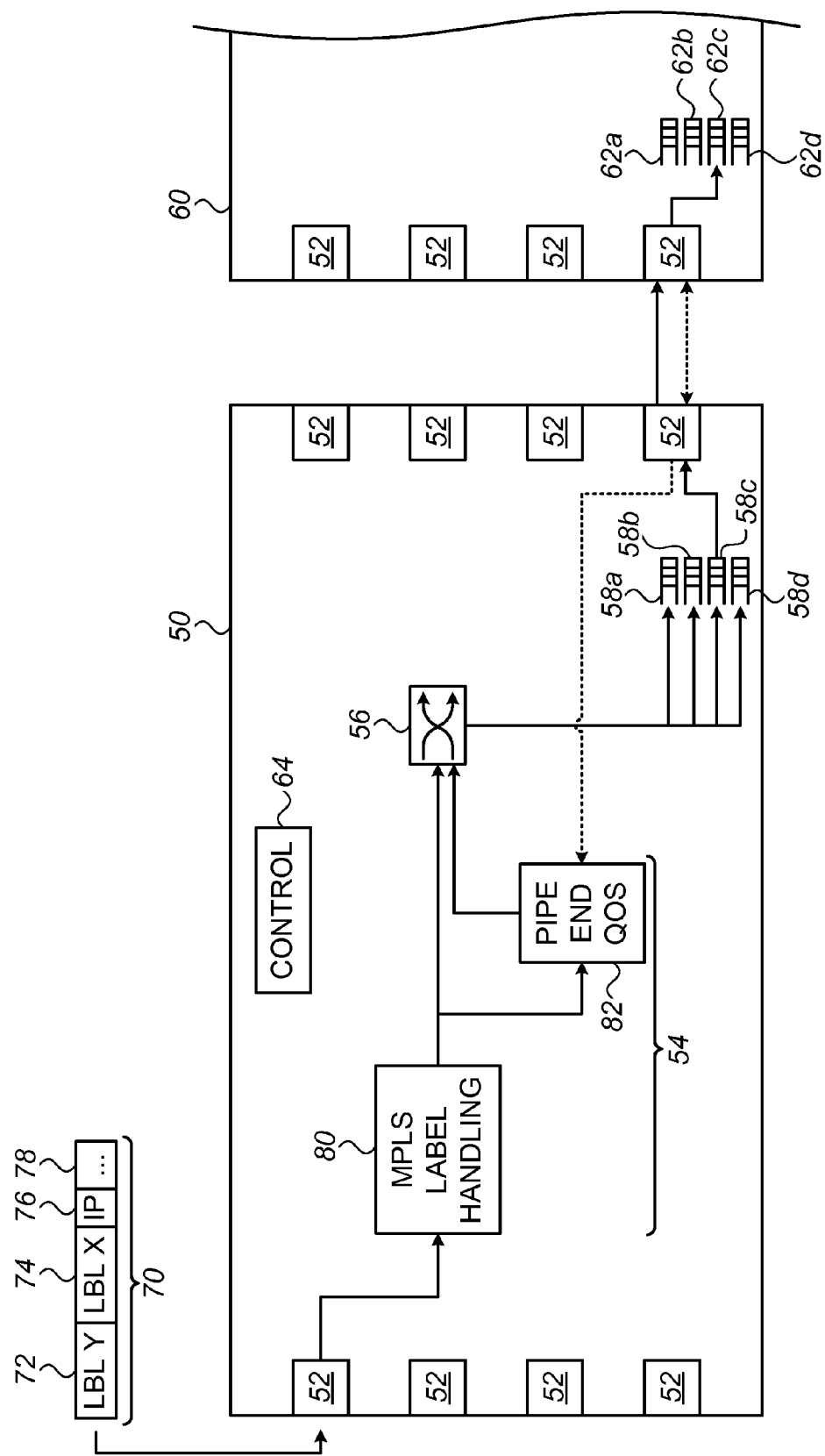
FIG. 3 is a block diagram that schematically illustrates a router configured for label-based packet forwarding, in accordance with an embodiment of the invention.

FIG. 3 is a block diagram that schematically illustrates a router 50 that is configured for label-based packet forwarding, in accordance with an embodiment of the invention. Router 50 is adapted particularly to carry out the QoS adjustment functions of the transitional router that are described above, and can thus serve as penultimate router 36 in the method of FIG. 2, for example. All of the routers in network 26 may be provided with this QoS functionality, for use when and as needed.

Router 50 comprises multiple interfaces 52, which are connected to receive and transmit packets from and to network 26. Incoming packets are processed by MPLS decision logic 54, which chooses, based on the packet labels, the egress interface through which each packet should be forwarded and the QoS level to be applied. Decision logic 54 instructs switching logic 56 accordingly to pass the packet to the egress interface and to queue the packet in an output buffer 58 according to the QoS level. In the pictured example, four output buffers, labeled 58*a*, 58*b*, 58*c* and 58*d* (referred to collectively as "output buffers 58"), hold packets with different, respective QoS priorities for egress through interface 52. Egress interface 52 forwards the packets to a corresponding ingress interface of another router 60, where the packets are queued in input buffers 62*a*, 62*b*, 62*c* and 62*d*, again according to different levels of QoS priority. A controller 64, such as an embedded microprocessor in router 50, configures the label handling functions of decision logic 54 and the allocation of buffers to QoS levels in accordance with instructions received from a system management function in system 20.

Output buffers 58, as well as input buffers 62 in neighboring router 60, are illustrated for the sake of conceptual clarity as four actual, physical queues in proximity to the respective interfaces. In practice, however, these buffers may be implemented in other ways that are known in the art, such as in a shared memory, and may support a larger or smaller number of priority levels, depending on system requirements. Regardless of the actual implementation, it is assumed in the present example that output buffer 58*a* and input buffer 62*a* have the same priority level, as do the buffer pairs 58*b*/62*b*, 58*c*/62*c*, and 58*d*/62*d*.

An incoming packet 70 received by router 50 typically comprises an outer label 72, possibly followed by a stack of one or more inner labels 74, along with a header 76, such as an IP header, and a payload 78. MPLS label handling logic 80 within decision logic 54 comprises an ILM and NHLFE table, as are known in the art, and handles label 72 in the conventional manner. Thus, logic 80 will normally read the EXP field in label 72 (or possibly label 74, if the NHLFE instructions indicate that the outer label is to be popped) and will instruct switching logic 56 to pass packet 70 to the output buffer 58 that corresponds to the QoS level indicated by the EXP field.

Router 60 will choose input buffer 62 in which to receive packet 70, however, based on the QoS level signaled by the applicable QoS field of the packet as it is transmitted by router 50 and received at ingress interface 52 of router 60. Depending on the configuration of the packet and its handling by logic 54, the applicable QoS field may be, for example, the EXP field in label 74, or the DSCP field in header 76, or possibly the PCP field in the Layer 2 header of the packet. When router 50 serves as the transitional router in pipe 30 (for example, as penultimate router 36, performing PHP), the QoS level signaled in this manner to router 60 may be different from the QoS level chosen by logic 80, as described above. In consequence of the QoS mismatch, logic 54 will place packets in an output buffer with a given priority, such as buffer 58*b*, but the same packets will be queued by router 60 in an input buffer with a different priority, such as buffer 62*c*.

In this sort of situation, if buffer 62*c* experiences congestion, interface 52 of router 60 will transmit flow control packets (such as PFC pause frames, for example) back to the corresponding interface 52 of router 50. These flow control packets will exert "back-pressure" on buffer 58*c*, causing delay of packet transmission through router 50 until the congestion is resolved, and thus preventing packet discard. These flow control packets will have no effect, however, on transmission of packets that are queued in buffer 58*b*, although they will block traffic in buffer 58*c*, whose transmission should actually be allowed. Therefore, if packets destined for buffer 62*c* are queued by logic 54 in buffer 58*b*, as may occur due to the QoS mismatch described above, router 50 will continue transmitting these packets to router 60 notwithstanding the flow control measures of buffer 62*c*, leading to overflow of buffer 62*c* and, consequently, packet loss.

To avoid this sort of situation, pipe-end QoS logic 82 is added to decision logic 54 and processes packets for which router 50 is the transitional router in proximity to the end of pipe 30. Upon receiving such a packet, logic 82 inspects the appropriate packet field (such as the EXP, DSCP, or PCP field that is to signal the QoS level to router 60), and selects the appropriate output buffer 58 accordingly. Thus, in the present example, QoS logic 82 will instruct switching logic 56 to queue packet 70 in buffer 58*c*. If and when buffer 62*c* experiences congestion, transmission of packet 70 from buffer 58*c* will be paused, so that packet loss can be avoided, while traffic in buffer 58*b* will continue to be transmitted without interruption.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   configuring routers in a packet data network to forward packets over the network in accordance with Multiprotocol Label Switching (MPLS) labels appended to the packets;
   defining a pipe through the network having an ingress and an egress and traversing a sequence of the routers between the ingress and the egress, and specifying for the pipe an outer label that indicates a first quality of service for the packets in the pipe;
   upon receiving at the ingress a packet for transmission through the pipe, appending the outer label to the packet, and forwarding the packet with the outer label through the pipe;
   at each of the routers in the sequence, up to a transitional router in proximity to the egress, forwarding the packet through the pipe in accordance with the outer label at the first quality of service; and
   at the transitional router, popping the outer label from the packet, identifying, based on a field remaining in the packet after popping the outer label, a second quality of service, different from the first quality of service, and forwarding the packet through the egress from the pipe toward a destination of the packet at the second quality of service.

2. The method according to claim 1, wherein forwarding the packet comprises signaling the second quality of service from the transitional router to a recipient router that is to receive the forwarded packet from the transitional router.

3. The method according to claim 1, wherein the transitional router is a penultimate router, and wherein forwarding the packet through the egress comprises forwarding the packet from the penultimate router to an egress router of the pipe, wherein the egress router continues to forward the packet toward the destination at the second quality of service.

4. The method according to claim 1, wherein the field remaining in the packet comprises a traffic class field of an inner MPLS label, which was encapsulated by the outer label.

5. The method according to claim 1, wherein the field remaining in the packet comprises a Diff-Serv field of an Internet Protocol (IP) header, which was encapsulated by the outer label.

6. The method according to claim 1, wherein the field remaining in the packet comprises a Priority Code Point (PCP) field of a Layer-2 header of the packet.

7. A method for communication, comprising:
   configuring routers in a packet data network to forward packets over the network in accordance with Multiprotocol Label Switching (MPLS) labels, which are appended to the packets and indicate qualities of service for the packets in the network;
   receiving at a given router in the network a packet forwarded to the given router in accordance with an outer label appended to the packet, with a first quality of service indicated by the outer label; and
   popping the outer label from the packet at the given router, and forwarding the packet from the given router over a Layer-2 link toward a destination of the packet with a second quality of service, different from the first quality of service, that is indicated by a Priority Code Point (PCP) field of a Layer-2 header of the packet.

8. The method according to claim 7, wherein the Layer-2 link comprises an Ethernet link.

9. A system for communication, comprising a plurality of routers in a packet data network, which are configured to forward packets over the network in accordance with Multiprotocol Label Switching (MPLS) labels appended to the packets, and to accept a definition of a pipe through the network having an ingress and an egress and traversing a sequence of the routers between the ingress and the egress, and a specification for the pipe of an outer label that indicates a first quality of service for the packets in the pipe,
   wherein one of the routers, at the ingress of the pipe, is configured as an ingress router of the pipe, and another of the routers, in proximity to the egress from the pipe, is configured as a transitional router,
   wherein upon receiving a packet for transmission through the pipe, the ingress router appends the outer label to the packet, and forwards the packet with the outer label through the pipe, so that each of the routers in the sequence, up to the transitional router, forwards the packet through the pipe in accordance with the outer label at the first quality of service, and
   wherein the transitional router pops the outer label from the packet, identifies, based on a field remaining in the packet after popping the outer label, a second quality of service, different from the first quality of service, and forwards the packet through the egress from the pipe toward a destination of the packet at the second quality of service.

10. The system according to claim 9, wherein the transitional router is configured to signal the second quality of service to a recipient router that is to receive the forwarded packet from the transitional router.

11. The system according to claim 9, wherein the transitional router is a penultimate router and is configured to forward the packet from the penultimate router to an egress router of the pipe, wherein the egress router continues to forward the packet toward the destination at the second quality of service.

12. The system according to claim 9, wherein the field remaining in the packet comprises a traffic class field of an inner MPLS label, which was encapsulated by the outer label.

13. The system according to claim 9, wherein the field remaining in the packet comprises a Diff-Serv field of an Internet Protocol (IP) header, which was encapsulated by the outer label.

14. The system according to claim 9, wherein the field remaining in the packet comprises a Priority Code Point (PCP) field of a Layer-2 header of the packet.

15. A system for communication, comprising a plurality of routers in a packet data network, which are configured to forward packets over the network in accordance with Multiprotocol Label Switching (MPLS) labels, which are appended to the packets and indicate qualities of service for the packets in the network, wherein at least one of the routers in the network is configured, upon receiving a packet forwarded to the at least one of the routers in accordance with an outer label appended to the packet, with a first quality of service indicated by the outer label, to pop the outer label from the packet, and to forward the packet over a Layer-2 link toward a destination of the packet with a second quality of service, different from the first quality of service, that is indicated by a Priority Code Point (PCP) field of a Layer-2 header of the packet.

16. The system according to claim 15, wherein the Layer-2 link comprises an Ethernet link.

* * * * *